(12) United States Patent
Paniconi et al.

(10) Patent No.: US 7,957,466 B2
(45) Date of Patent: Jun. 7, 2011

(54) ADAPTIVE AREA OF INFLUENCE FILTER FOR MOVING OBJECT BOUNDARIES

(75) Inventors: Marco Paniconi, Campbell, CA (US); James J. Carrig, San Jose, CA (US); Zhourong Miao, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1603 days.

(21) Appl. No.: 11/228,610

(22) Filed: Sep. 16, 2005

(65) Prior Publication Data

US 2007/0064802 A1 Mar. 22, 2007

(51) Int. Cl.
- H04N 7/12 (2006.01)
- H04N 11/02 (2006.01)
- H04N 11/04 (2006.01)
- G06T 15/30 (2011.01)
- G06K 9/00 (2006.01)
- G06K 9/46 (2006.01)

(52) U.S. Cl. ......... 375/240.16; 375/240.02; 375/240.12; 345/423; 348/402.1; 348/404.1; 348/407.1; 348/413.1; 348/416.1; 382/103; 382/107; 382/236; 382/239

(58) Field of Classification Search .............. None
See application file for complete search history.

(56) References Cited

U.S. PATENT DOCUMENTS

| | | | |
|---|---|---|---|
| 4,922,341 A | 5/1990 | Strobach | |
| 5,047,850 A | 9/1991 | Ishii et al. | |
| 5,654,771 A | 8/1997 | Tekalp | |
| 5,872,866 A | 2/1999 | Strongin et al. | |
| 5,974,188 A | 10/1999 | Benthal | |
| 6,178,205 B1 | 1/2001 | Cheung et al. | |
| 6,208,692 B1 | 3/2001 | Song et al. | |
| 6,212,235 B1 | 4/2001 | Nieweglowski et al. | |
| 6,466,624 B1 | 10/2002 | Fogg | |
| 6,480,615 B1 | 11/2002 | Sun et al. | |
| 6,591,015 B1 | 7/2003 | Yasunari et al. | |

(Continued)

FOREIGN PATENT DOCUMENTS

WO   WO 00/16563 A1   3/2000

(Continued)

OTHER PUBLICATIONS

Wang et al. ("Spatio-temporal segmentation of video data", MIT Media Lab Vision and Modeling Group, Tech Report No. 262, 1994, pp. 1-12).*

Zhang et al. ("Segmentation of moving objects in image sequence: a review", Circuits, systems, and signal processing, vol. 20, No. 2, 2001, pp. 1-29).*

Leymarie et al, Tracking Deformable Objects in the Plane Using an Active Contour Model, IEEE Trans. on Pattern Analysis and Mach. Intel., vol. 15 No. 6, Jun. 1993, pp. 617-634.

(Continued)

*Primary Examiner* — Tom Y Lu
*Assistant Examiner* — Thomas A Conway
(74) *Attorney, Agent, or Firm* — Blakely, Sokoloff, Taylor & Zafman LLP

(57) ABSTRACT

A method of performing adaptive temporal prediction includes receiving a target image, wherein a position of an object in the target image is different from a position of the object in a reference image, using a boundary of the object to generate an irregular pattern of target image motion vectors, using the target image motion vectors to partition the target image into area of influence cells, wherein each area of influence cell contains a unique one of the target image motion vectors, and generating a prediction of the target image by applying an adaptive area of influence filter to the area of influence cells.

9 Claims, 17 Drawing Sheets

U.S. PATENT DOCUMENTS

| | | |
|---|---|---|
| 6,608,865 B1 | 8/2003 | Itoh |
| 6,690,729 B2 | 2/2004 | Hayashi |
| 6,754,269 B1 | 6/2004 | Yamaguchi et al. |
| 6,765,965 B1 | 7/2004 | Hanami et al. |
| 6,782,054 B2 | 8/2004 | Bellers |
| 6,864,994 B1 | 3/2005 | Harrington |
| 2004/0057517 A1 | 3/2004 | Wells |
| 2004/0062307 A1 | 4/2004 | Hallapuro et al. |
| 2004/0131267 A1 | 7/2004 | Adiletta et al. |
| 2004/0233991 A1 | 11/2004 | Sugimoto et al. |
| 2005/0100092 A1 | 5/2005 | Sekiguchi et al. |
| 2005/0135483 A1 | 6/2005 | Nair |

FOREIGN PATENT DOCUMENTS

| | | |
|---|---|---|
| WO | WO 01/78402 A1 | 10/2001 |
| WO | WO 02/37859 A2 | 5/2002 |
| WO | WO 2004/047454 A1 | 6/2004 |
| WO | WO 2005/069629 A1 | 7/2005 |

OTHER PUBLICATIONS

Reshef et al, Low Bit-Rate Video Coding Using Iterave Affine Motion Estimation and Quadtree Segmentation, Proc. Int'l Conf. on Dig. Signal Processing, Jun. 1995 pp. 427-431.

Chang et al, Simultaneous Motion Estimation and Segmentation, IEEE Transactions on Image Processing, vol. 6 No. 9, Sep. 1997, pp. 1326-1333.

Zhang et al, Image Sequence Segmentation Using 3-D Structure Tensor and Curve Evolution, IEEE Trans. on Circuits and Sys. For Video Tech., vol. 11 No. 5, May 2001, pp. 629-640.

Orchard et al, Overlapped Block Motion Compensation: An Estimation-Theoretic Approach, IEEE Transactions on Image Processing, vol. 3 No. 5, Sep. 1994, pp. 693-699.

Du et al, Two Dimensional Hierarchical Mesh Based Video Compression Techniques, 6th Int'l Symposium on DSP for Communication Systems, 2002, Sydney Australia, pp. 247-252.

* cited by examiner

ADAPTIVE AREA OF INFLUENCE FILTER FOR MOVING OBJECT BOUNDARIES

FIELD OF INVENTION

The invention is related to the field of video compression.

BACKGROUND

A temporal prediction filter is used in a video compression process to predict a target image from a set of previously decoded reference images. The temporal prediction process is effective at removing a significant amount of temporal redundancy, which generally results in a higher coding efficiency. The prediction process uses a set of motion vectors and a filter that operates on the motion vectors to predict the target image.

For example, the prediction method divides a reference image 110 into multiple fixed-size blocks 120, as shown in FIG. 1. Each block has an associated motion vector to describe the motion of the block relative to the target image. The motion vectors are shown by the white dots in image 110. A temporal prediction filter uses the associated motion vector to perform a simple motion compensation technique on each block in the reference image to predict the location of the block in the target image. Thus, each block in the target image is estimated from a block in the reference image using the single motion vector. However, this approach treats each motion vector independently and is not adaptive to image features.

Conventional temporal filters, which use a single motion vector to predict the location of an associated block, or rely on a filter defined for a regular motion vector pattern, need a regular distribution of motion vectors to perform temporal prediction. Therefore, they are unable to adapt the prediction process to an irregular pattern of motion vectors. There is a need for a filter that can locally adapt its tap and filter coefficients to the variations of an irregular pattern of motion vectors. There is also a need for a temporal filter that has flexibility to adapt to object boundaries and spatial textures.

SUMMARY

A method of performing adaptive temporal prediction includes receiving a target image, wherein a position of an object in the target image is different from a position of the object in a reference image, using a boundary of the object to generate an irregular pattern of target image motion vectors, using the target image motion vectors to partition the target image into area of influence cells, wherein each area of influence cell contains a unique one of the target image motion vectors, and generating a prediction of the target image by applying an adaptive area of influence filter to the area of influence cells.

BRIEF DESCRIPTION OF THE DRAWINGS

The present invention is illustrated by way of example and may be better understood by referring to the following description in conjunction with the accompanying drawings, in which.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. For example, skilled artisans will understand that the terms field or frame or image that are used to describe the various embodiments are generally interchangeable as used with reference to video data.

An adaptive area of influence (AAOI) temporal filter automatically adapts to an irregular pattern of motion vectors, object features, and spatial textures when predicting a target image. The AAOI filter operates in the time-domain over motion compensated signals, which is different from other methods that attempt to filter motion vectors directly (e.g., triangulation filtering in the motion vector domain). For example, because the AAOI filtering method operates in the time-domain, it is more amenable to adaptation to object and spatial textures. In one embodiment, the AAOI filter performs a two stage process to couple neighboring motion vectors during the prediction of a pixel. The first stage adapts the filter to an irregular sampling pattern of motion vectors, to object shapes, and to boundaries. The second stage adapts the filter to spatial textures of the image.

Figure 1:
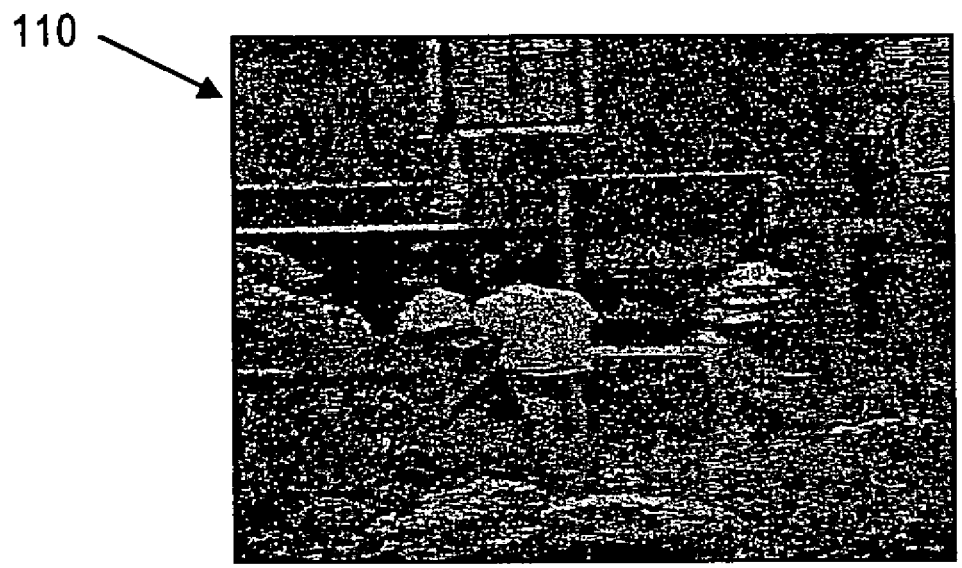
FIG. 1 shows an example of a reference image divided into multiple fixed-size blocks.
Figure 1:
Figure 1:
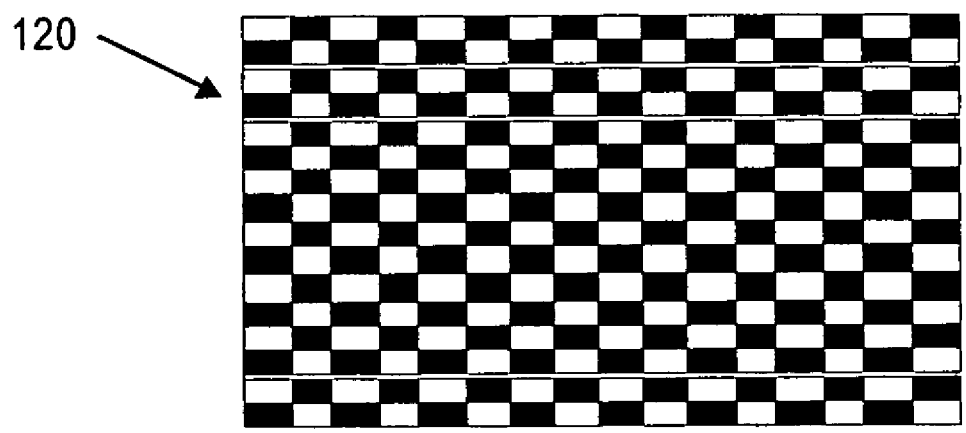
Figure 2A:
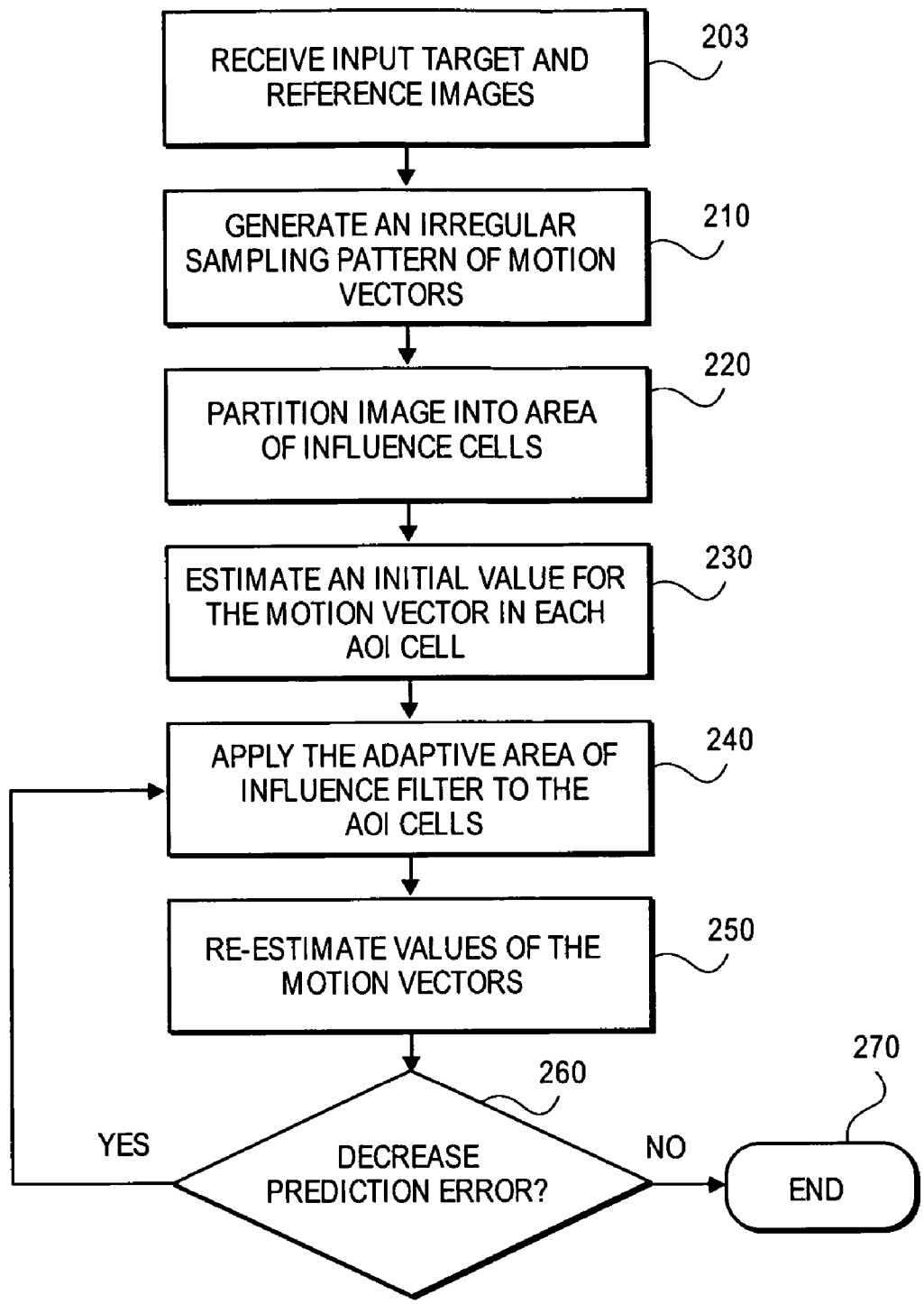
FIGS. 2A and 2B show examples of adaptive temporal filtering for a moving object boundary.

An example of an adaptive temporal filtering procedure is shown in FIG. 2A. At 203, a target image, one or more reference images, and boundaries of moving objects in the target image are received. At 210, an irregular sampling pattern of motion vectors is generated for the target image using the moving object boundaries. At 220, the target image is partitioned into area of influence (AOI) cells, where each AOI cell has one motion vector as its node. At 230, an initial value for each motion vector is estimated. At 240, an adaptive area of influence filter is applied to the AOI cells to generate a prediction of the target image. At 250, the prediction results produced by the filter are used to re-estimate the values of the motion vectors, so as to improve the accuracy of the adaptive filter. At 260, in some embodiments, the process returns to 240 to decrease the prediction error generated by the adaptive area of influence filter. Otherwise, the process ends at 270.

Figure 2B:
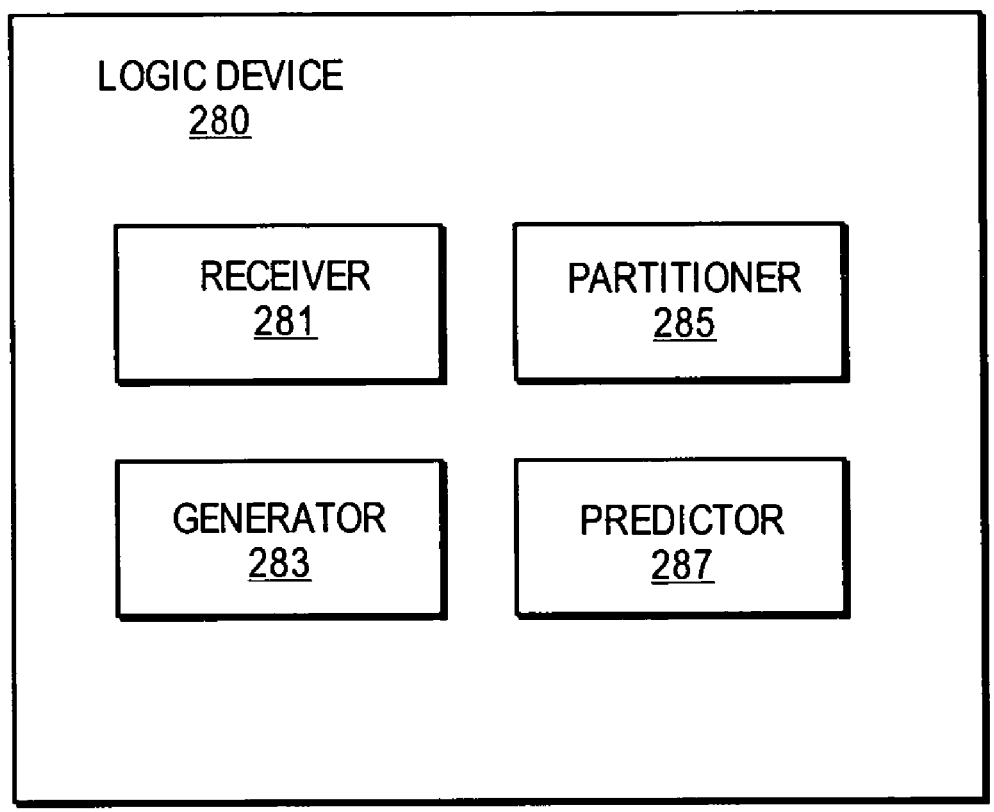

An example of a logic device that implements the method shown in FIG. 2A is shown in FIG. 2B. The logic device 280 includes a receiver 281 that receives a target image and a reference image. The receiver 281 also receives data for a boundary of a moving object from the target image. A generator 283 uses the data for the boundary of the moving object to generate an irregular sampling pattern of motion vectors for the target image. Partitioner 285 partitions the target image into area of influence cells, each area of influence cell containing one of the motion vectors. Predictor 287 applies an adaptive area of influence filter to the area of influence cells to generate a prediction of the target image.

Figure 3A:
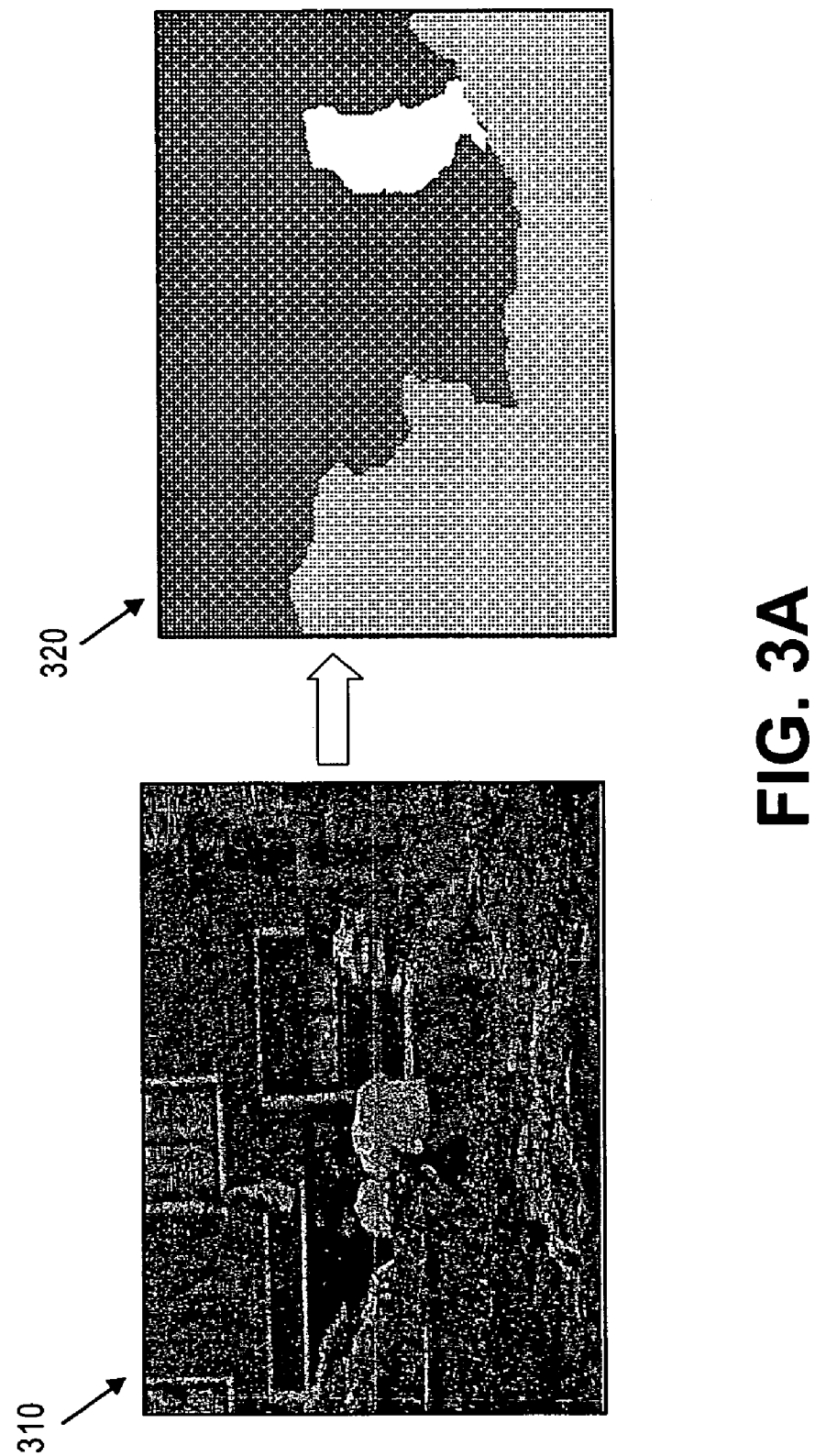
FIG. 3A shows an example of moving object boundaries that are extracted from a target image.

The elements of FIG. 2A will now be discussed in greater detail. An example of moving object boundaries that are extracted from a target image at 205 of FIG. 2A is shown in block 320 of FIG. 3A. In block 320, the black region corresponds to the background region of the target image 310. The white region corresponds to the man who is moving relative to the background, and the gray region corresponds to the foreground region of the target image, which also appears to move relative to the background. An example of an irregular pattern of motion vectors that is generated using the moving object boundaries at 210 of FIG. 2A is shown in block 330 of FIG. 3B. The white dots in the image 330 represent the motion vectors. With this adaptive sampling pattern, the motion vectors are more concentrated along the moving object boundaries, which are regions that are difficult to predict from a reference image. Fewer motion vectors are placed in simple motion regions, such as the background region, for example.

Figure 4A:
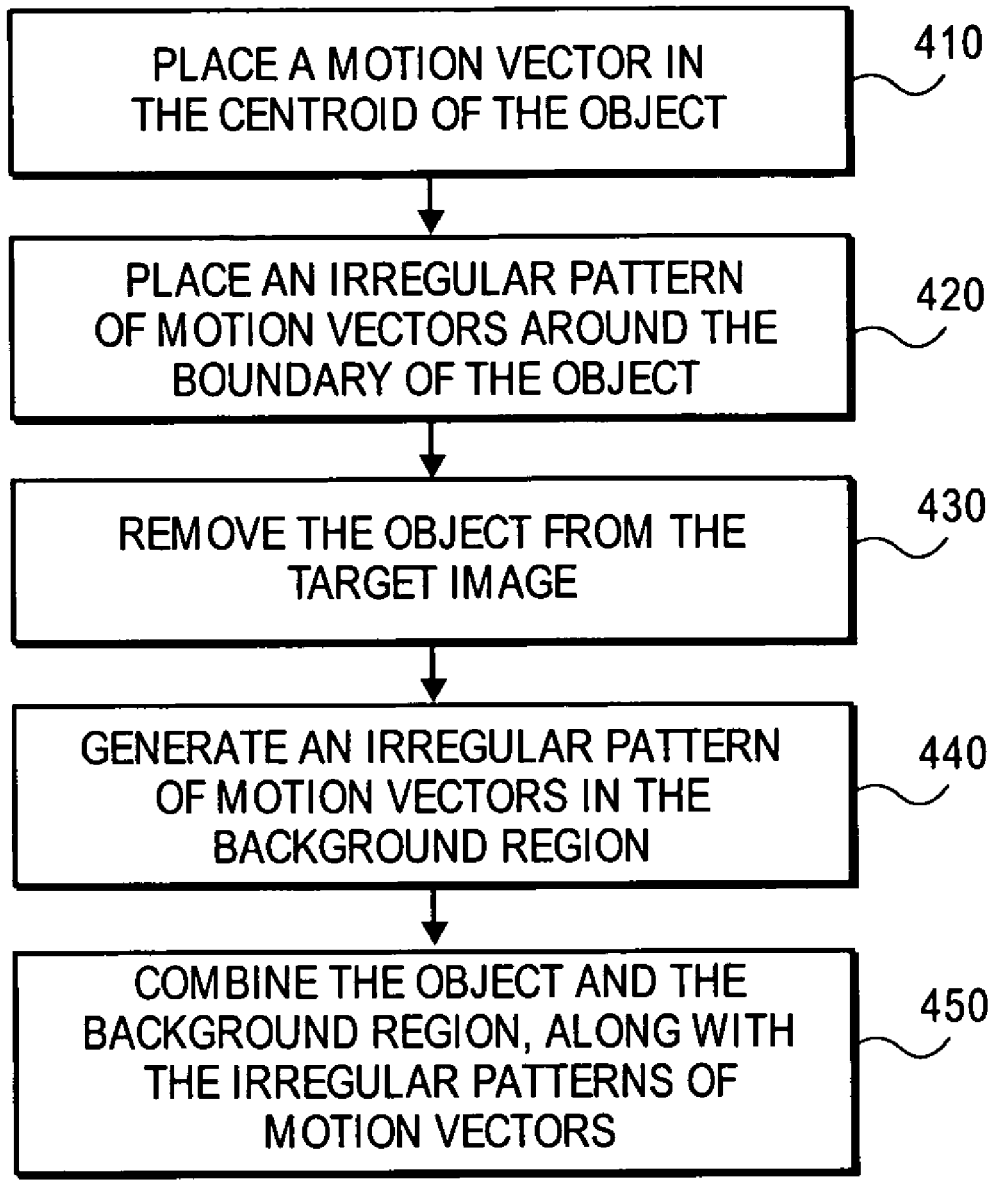
FIG. 4A shows an example of a method for generating an irregular pattern of motion vectors.

In some embodiments, the irregular pattern of motion vectors is generated at 210 of FIG. 2A by the method shown in FIG. 4A. At 410, a motion vector is placed in the centroid of the moving object. At 420, an irregular pattern of motion vectors is placed around the object boundary using parameters such as a distance, d, between two motion vectors along a tangent to the boundary; a width, w, between a motion vector inside the boundary and a motion vector outside the boundary along a path that is normal to the boundary. An inside stride, istr, determines a number of motion vectors inside the boundary along the normal path; and an outside stride, ostr, determines a number of motion vectors outside the boundary along the normal path.

The parameters can be varied according to the degree of motion along the boundary and the degree of definition of the boundary. For example, if the motion is complex and the boundary is rough, then the values of w and d are decreased, and the values of the inside and outside strides are increased, to place more motion vectors in this region. Alternatively, if the motion of the object is simple and the boundary is clear, then fewer motion vectors are needed. Therefore, the values of w and d are increased, and the stride values are decreased. The result is an irregular pattern of motion vectors along the boundary of the moving object.

At 430, the moving object is removed from the target image, leaving the background region. At 440, an irregular pattern of motion vectors is generated for the background region. In some embodiments, a fixed number of motion vectors are applied to the target image. The number of motion vectors available for the background region is the remaining number after the irregular pattern of motion vectors is placed around the boundary. Then, at 450, the moving object and background region, along with their irregular patterns of motion vectors, are combined.

Figure 4B:
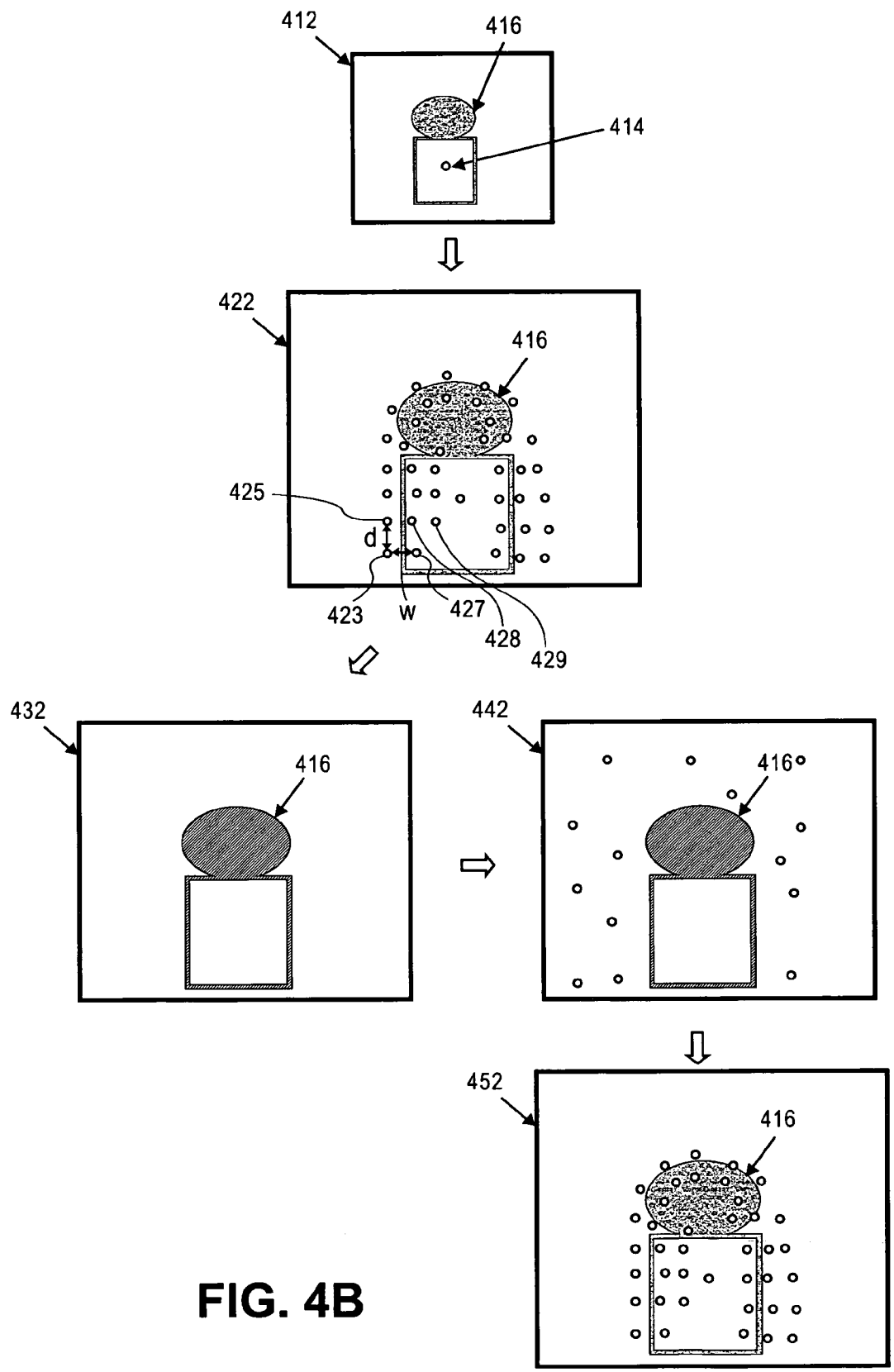
FIG. 4B shows examples of the intermediate results of the method of FIG. 4A.

The intermediate results of the method of FIG. 4A are shown in FIG. 4B. In block 412, a motion vector 414 is placed at a location inside of the object. For example, in some embodiments, the motion vector is placed at the centroid of object 416. In 422, an irregular pattern of motion vectors are placed around object 416 according to parameters such as d, w, istr and ostr. An example of the distance d is shown between motion vectors 423 and 425. The width w is shown between motion vectors 423 and 427. Motion vectors 428 and 429 are examples of an inside stride parameter having a value of two. An example of an outside stride parameter ostr having a value of one is shown by motion vector 423. In block 432, object 416 is removed from the image, leaving the background region 436. In block 442, an irregular pattern of motion vectors is generated for the background region. In block 452, the irregular patterns are combined in the target image.

Returning to FIG. 2A, at 220, the image is partitioned into multiple cells, called area of influence cells (AOI cells). Each AOI cell has one motion vector as its node. An example of an image partitioned into AOI cells is shown in 340 of FIG. 3B. Each AOI cell represents a region that is influenced more by the motion vector inside of the cell than by any other motion vector in the image. Because an AOI cell is generated for each motion vector, the size of the AOI cells may be related to features of objects in the image, such as boundary regions. For example, AOI cells near a boundary region between objects may be smaller than AOI cells in an image background region. Also, the shape of the AOI cell can be locally modified to adapt to the shape of an object's boundary. One embodiment of a method for generating AOI cells is a distance nearest motion vector partitioning method (e.g., Voronoi cells). Other partitioning methods may be used, such as block or triangular methods for example.

Referring to FIG. 2A, at 230, an initial motion estimation is performed to determine an initial value for the motion vector in each AOI cell. The initial motion estimation maps the AOI cell associated with the motion vector to a corresponding cell in the reference image, and measures a displacement between the two cells. The displacement provides the initial value for each motion vector. Consequently, the initial value does not reflect any influence from surrounding motion vectors, because it is determined by this cell-to-cell mapping and displacement measurement. Therefore, the initial value for a particular motion vector is independent of other motion vectors.

At 240, the adaptive area of influence (AAOI) filter is applied to the area of influence cells to perform temporal prediction for the target image. The filter is applied in the time domain to generate a prediction result for the target image given the set of motion vector values and sampling pattern. The AAOI filter uses a filter tap and filter coefficients that are defined by an area of overlapping regions to capture the relevance of motion vectors neighboring a pixel to be predicted. The adaptive area of influence filter is applied to the area of influence cells to generate a temporal prediction of the target image from the reference image and the set of motion vectors. The filter has the following structure. Let $\{v_j\}$ denote the set of N motion vectors, and I(x) the reference image (a previously decoded image). Let S(x) denote some set of motion vectors surrounding the location of pixel x. The prediction of that target pixel x can be generally expressed as:

$$I^{pred}(x) = \sum_{i \in S(x)} f_i I^{ref}(x + v_i) \quad (1)$$

where $\{f_i\}$ is a set of filter coefficients, and $x+v_i$ is the motion compensated pixel when motion vector $v_i$ is applied to pixel x. The support or tap of the filter is defined by the set S(x). The tap support S(x) and the filter coefficients $\{f_i\}$ are, in general, functions of the pixel position x and its neighboring motion vectors. That is, the filter coefficients can change for each pixel, because the distribution of motion vectors changes throughout the image. Hence, the filter locally adapts to the changing motion vector pattern.

Figure 5:
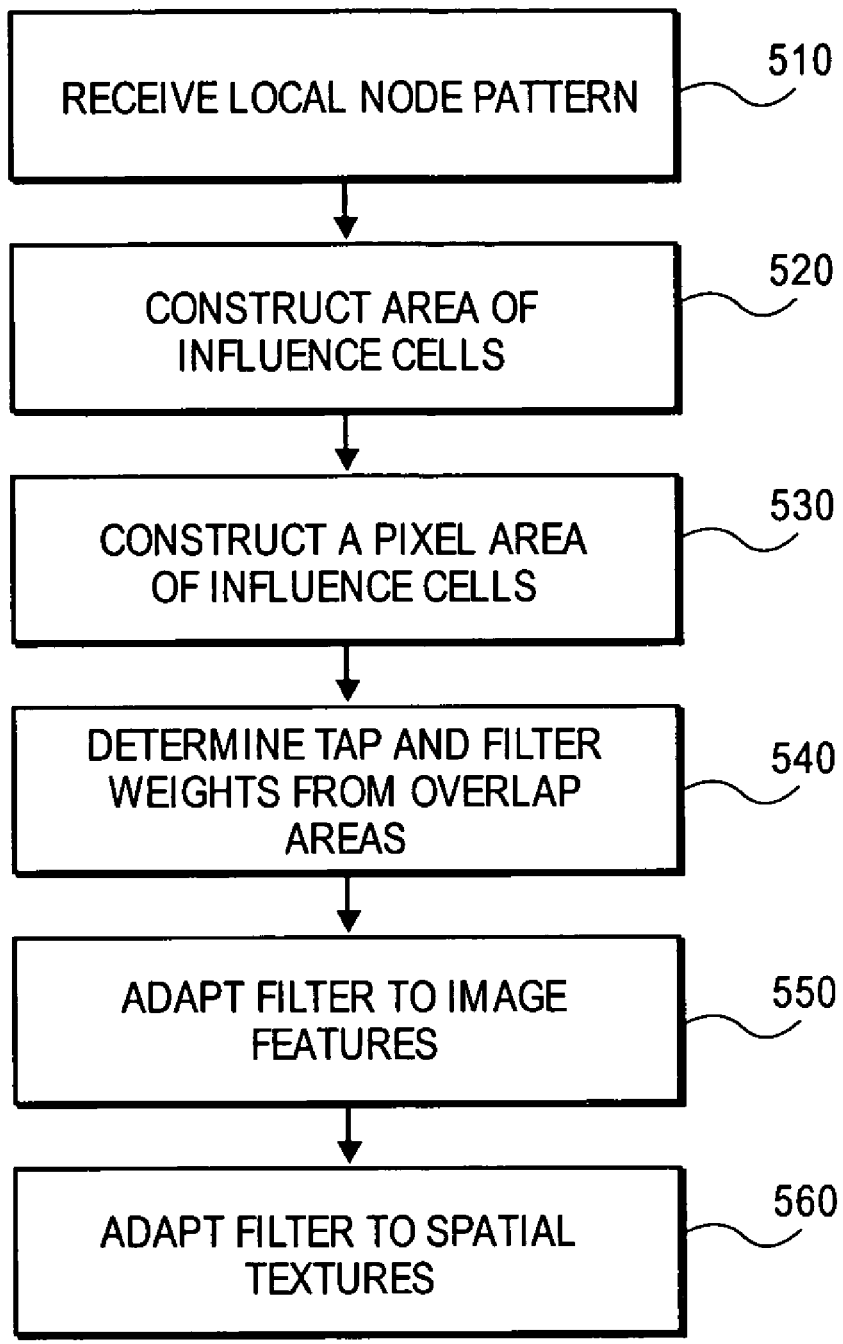
FIG. 5 shows an example of a method of computing filter coefficients.

In one embodiment, filter coefficients $\{f_i\}$ are computed using the method illustrated by FIG. 5. In the first stage, a natural tap structure and filter weights are defined, and in the second stage, the filter is adapted to spatial textures of the image. The first stage generates an AAOI filter that can adapt to features such as an irregular sampling pattern, as well as object shapes and boundaries. The second stage allows the AAOI filter to adapt to spatial textures of the image during a motion vector based temporal prediction process for video compression.

The first stage begins at 510, receiving a local motion vector sampling pattern, that contains motion vectors in the neighborhood of a target pixel to be predicted. At 520, area of influence cells are constructed around each local motion vector. The local area of the target pixel is thus partitioned into a set of AOI cells. At 530, in order to interpolate the pixel, it is viewed as a new node, and a pixel area of influence cell is constructed around it. Then, at 540, the area of each neighboring AOI cell that overlaps the pixel area of influence cell is determined. The overlapping areas define a natural tap structure and filter weight. In other words, the tap structure is defined by each motion vector i whose AOI cell has a non-zero overlapping area $A_i$ with the pixel area cell. The filter weight of each motion vector in the tap structure is defined by the ratio $A_i/A$. That is, for some pixel location x:

$$S(x) = \{i \mid A_i > 0\} \quad (2)$$
$$f_i = \frac{A_i}{A}$$

where S(x) is a set of local motion vectors in the neighborhood of pixel x, $A_i$ is an overlapping area of an AOI cell for motion vector i in the set S(x) and the pixel influence cell, A is the total overlap area of the AOI cells and the pixel influence cell, and $f_i$ is the filter weight.

At 550, the filter is adapted to image features, such as an object boundary of a moving object, for example. The shape of the area of influence cells in some embodiments changes to adapt to the boundary of the moving object. The area cells are adapted to an object boundary in the image by constraining the motion vector area cells and pixel area cell to include only pixels that belong to the same object. This action generates modified AOI cells around the pixel to be predicted. Therefore, in one embodiment, the filter support and coefficients are expressed as:

$$S(x) = \{i \mid \tilde{A}_i > 0\} \quad (3)$$
$$f_i = \frac{\tilde{A}_i}{\tilde{A}}$$

where $\tilde{A}_i$ is the modified AOI cell for motion vector i, due to the object boundary. Each modified AOI cell includes pixels in the same motion layer as the pixel to be predicted, and excludes pixels in other motion layers. At the conclusion of this first stage, the filter has adapted to the both the irregular pattern of motion vectors and to the boundary of the moving object.

After generating a prediction for each pixel in the image, the second stage of the filtering process is performed. In the second stage, at 560, the filter is adapted to spatial textures. Because the prediction that is output from the first stage of the AAOI filter is in the form of a regular pattern of sampled data, a least squared (LS) trained filter is used in some embodiments in the second stage to adapt the filter to spatial textures. In another embodiment, a spatial adaptation process can directly modify the AOI cells in the first stage to include only those pixels that have a similar spatial texture.

Figure 6:
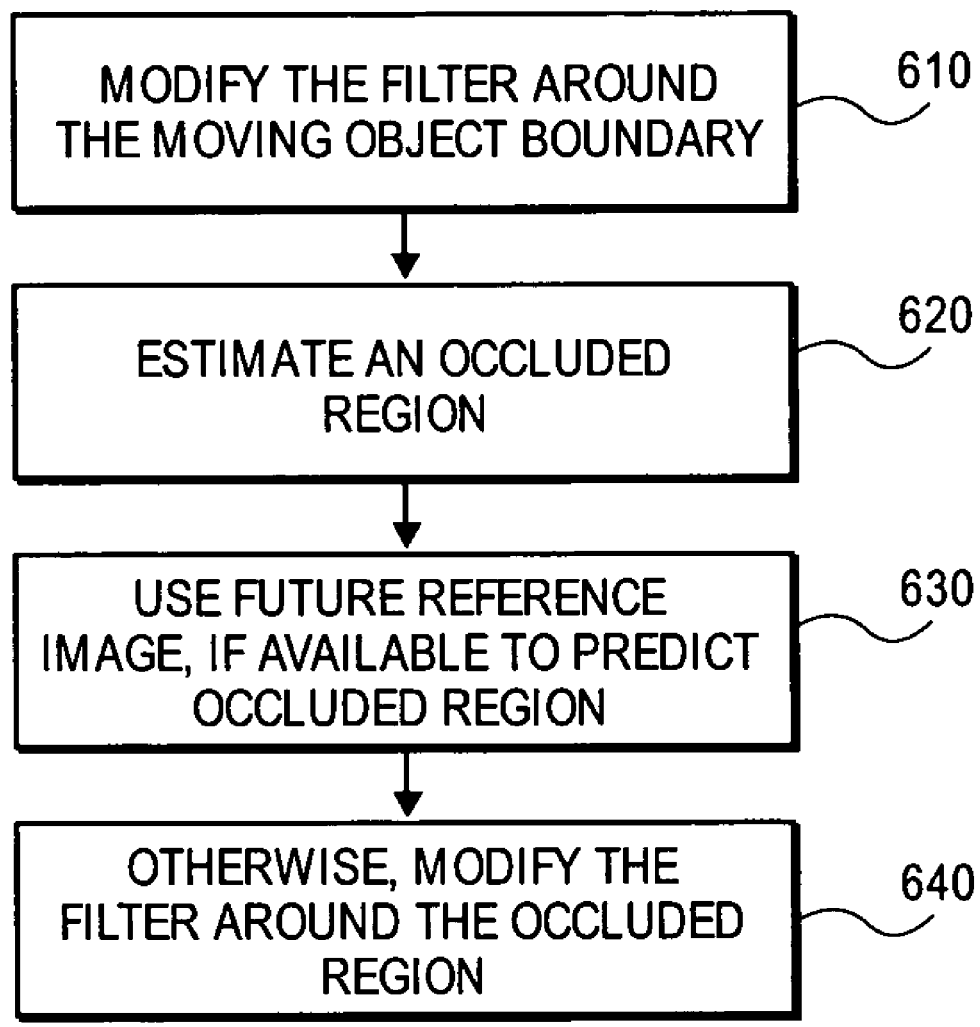
FIG. 6 shows an example of a method to adapt the filter to object features in an image.

FIG. 6 shows an example of a method to adapt the filter to image features at 550 of FIG. 5. At 610 the filter is modified around a moving object boundary. At 620 an occluded region is estimated using the object boundary and representative motion vectors. The occluded region is an area that is hidden relative to the reference image. At 630, if both a past reference image and a future reference image are available, the future reference image is used to predict the occluded region using the modified filter generated at 610. Otherwise, if only one reference image is available, then at 640 the filter is modified around the occluded region.

Referring to 610 in greater detail, the filter is modified by the presence of the moving object boundary, which separates motion layers, to consider motion vectors in the same motion layer as a pixel x to be predicted. Also, the moving object boundary is used to change the shapes of the AOI cells used to predict the pixel x. In some embodiments, this is performed by constructing each AOI cell as:

$$T_i = \{x \mid x \in O_i, \, dist(x, x_i) < dist(x, x_{j \in N, j \neq i})\} \quad (4)$$

where x is a pixel to be predicted, $x_i$ is a pixel position of a particular motion vector i in a set of N motion vectors, and $O_i$ is a motion layer assignment of an object for motion vector i. The AOI cell $T_i$ for motion vector i is the set of pixels $\{x\}$ such that pixel x belongs to the same motion layer $Q_i$ as motion vector i, and the distance between pixel x and motion vector i is smaller than the distance between pixel x and all other motion vectors j, j=1, ... N, j≠i. After each new AOI cell $T_i$ is constructed using eq. (4), its shape is modified using the moving object boundary to produce a filter weight from eq. (3).

Figure 7:
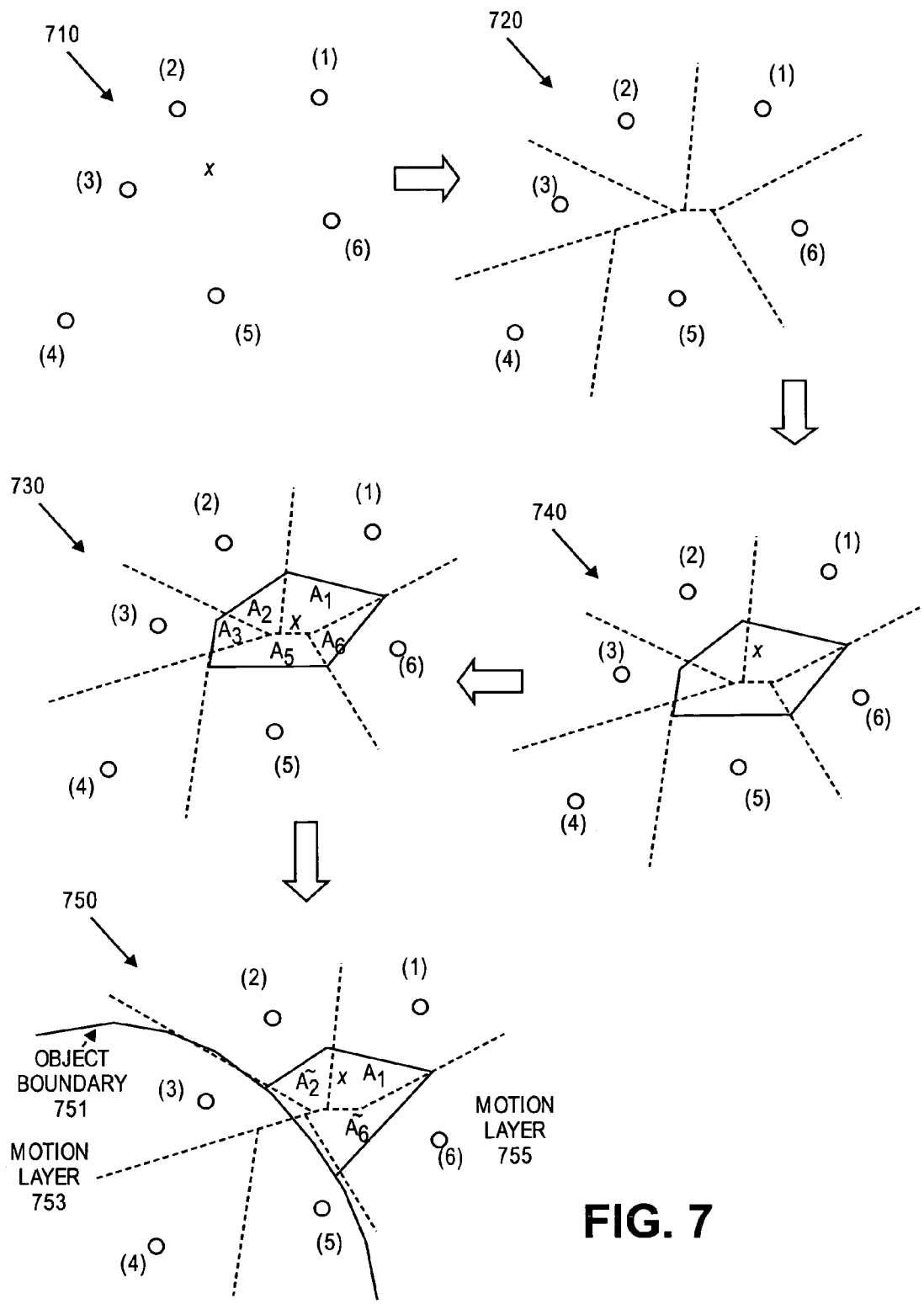
FIG. 7 shows an example of constructing AOI cells around an object boundary.

An example of constructing AOI cells around an object boundary and modifying their shapes is shown in FIG. 7. At 710, a local node pattern is received. The local node pattern includes a set of motion vectors (represented by the circles) that are in the neighborhood of pixel x, which needs to be predicted. The motion vectors are numbered, from (1) through (6). At 720, area of influence cells are constructed around the motion vectors. Each dashed line represents a boundary between AOI cells. At 730, a pixel area of influence cell, represented by the solid line, is constructed around the pixel x to be predicted.

At 740, an overlap area between the AOI cell of each motion vector and the AOI cell of the pixel is determined. For example, the AOI cell for motion vector (1) overlaps the pixel AOI cell in overlap area $A_1$. The tap and filter weights of the filter are determined by the overlap areas. The tap structure is defined by each motion vector i whose AOI cell has a non-zero overlapping area $A_i$ with the pixel area cell. In this example, the AOI cell for motion vector (4) does not overlap with the pixel AOI cell. Therefore, the filter tap structure for pixel x is motion vectors (1), (2), (3), (5), and (6). The filter weight of each motion vector in the tap structure is defined by the ratio $A_i/A$. For example, in this case, $f_1 = A_1/A$.

At 750, the filter is adapted to image features, such as an object boundary 751 of a moving object, for example. The moving object's object boundary 451 separates motion layers 753 and 755. To interpolate pixel x, the tap structure is modified to include motion vectors that are in the same motion layer as the pixel x. Because pixel x is in motion layer 755, the tap structure from 740 is modified using eq. (4) to remove motion vectors (3) and (5), leaving motion vectors (1), (2) and (6) as the tap structure.

Furthermore, at 750, the filter weights are adapted to the shape of the object boundary 751 using eq. (3). In this example, the shapes of the area of influence cells along object boundary 751 change to adapt to the boundary of the moving object. Object boundary 751 dissects the AOI cell for motion vector (2). To interpolate pixel x, which is in motion layer 755, the AOI cell for motion vector (2) is redefined to include only those pixels of its original cell that are in motion layer 755. This generates a modified AOI cell around motion vector (2). The shape of the AOI cell for motion vector (6) is also adapted to the object boundary 751. The area between the AOI cell for motion vector (6) and object boundary 751 is in motion layer 755. However, this area was initially included in the AOI cell for motion vector (5). Because motion vector (5) is no longer part of the tap structure for the filter, the pixels in this area now become part of the AOI cell for motion vector (6). The modified overlapping areas, $\tilde{A}_2$ and $\tilde{A}_6$, and overlapping area $A_1$, are used to generate filter weights for the modified filter.

Figure 8:
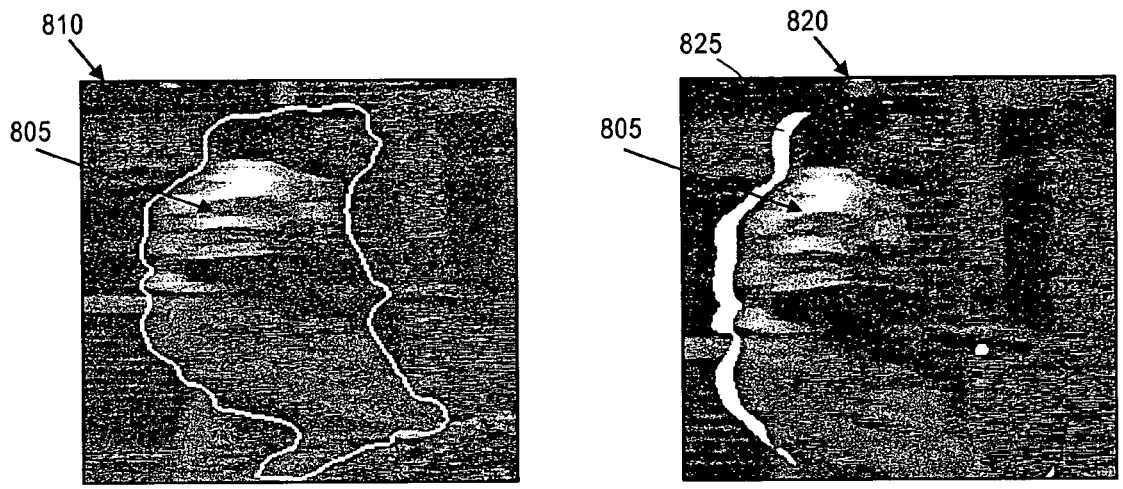
FIG. 8 shows an example of an occluded region for a moving object.

Returning to FIG. 6, at 620, the moving object boundary is used to estimate an occluded region. An example of an occluded region is shown in FIG. 8. A target image 820 is predicted using a past reference image 810. The displacement of the boundary of moving object 805 from its location in past reference image 810 to its location in target image 820 forms occluded region 825. The portion of the target image in occluded region 825 is covered in past reference image 810. Therefore, using past reference image 810 to predict the pixels in the occluded region of the target image 820 produces a poor result. To improve the prediction, at 630 of FIG. 6, if a future reference image is available, it is used to predict the pixels in the occluded region. Otherwise, at 640, the filter is modified again.

Referring to 640 in greater detail, if a single reference field is available for prediction, such as past reference image 810 of FIG. 8, another modification to the filter is made. This second modification improves the accuracy of the prediction in and around the occluded region. The motion vectors in the occluded region are unreliable and incoherent, because they map to pixels in the reference image that are unrelated to the corresponding pixels in the target image. The second modification allows the filter to use motion vector nodes that have some coherence to each other. For example, when predicting a pixel near an occluded region, the filter uses motion vectors that belong to same motion layer.

The modification for using a single reference field for predicting a target pixel in an occluded region uses only the nearest motion vector. To predict a target pixel near, but outside of, the occluded region, the modification constrains the area of influence cells to avoid using pixels in the occluded region.

In general, for motion vectors i that do not belong to occluded region C, each area of influence cell $T_i$ is constructed as:

$$T_i = \{x | x \in O_i, dist(x,x_i) < dist(x,x_{j \in N, j \neq i}), x \notin C\} \quad (5)$$

where x is a pixel to be predicted, $x_i$ is a pixel position of a particular motion vector i in a set of N motion vectors, and $O_i$ is a motion layer assignment of an object for motion vector i. The area of influence cell $T_i$ for motion vector i is the set of all pixels {x} such that pixel x belongs to the same motion layer as motion vector i; the distance between x and motion vector i is smaller than the distance between pixel x and all other motion vectors j, j=1, ... N, j≠i; and the pixel is not within the occluded region C. For motion vectors that are within occluded region C, area of influence cells are not constructed. Instead, target pixels in this region are predicted using the nearest motion vector to perform motion compensation.

Figure 9:
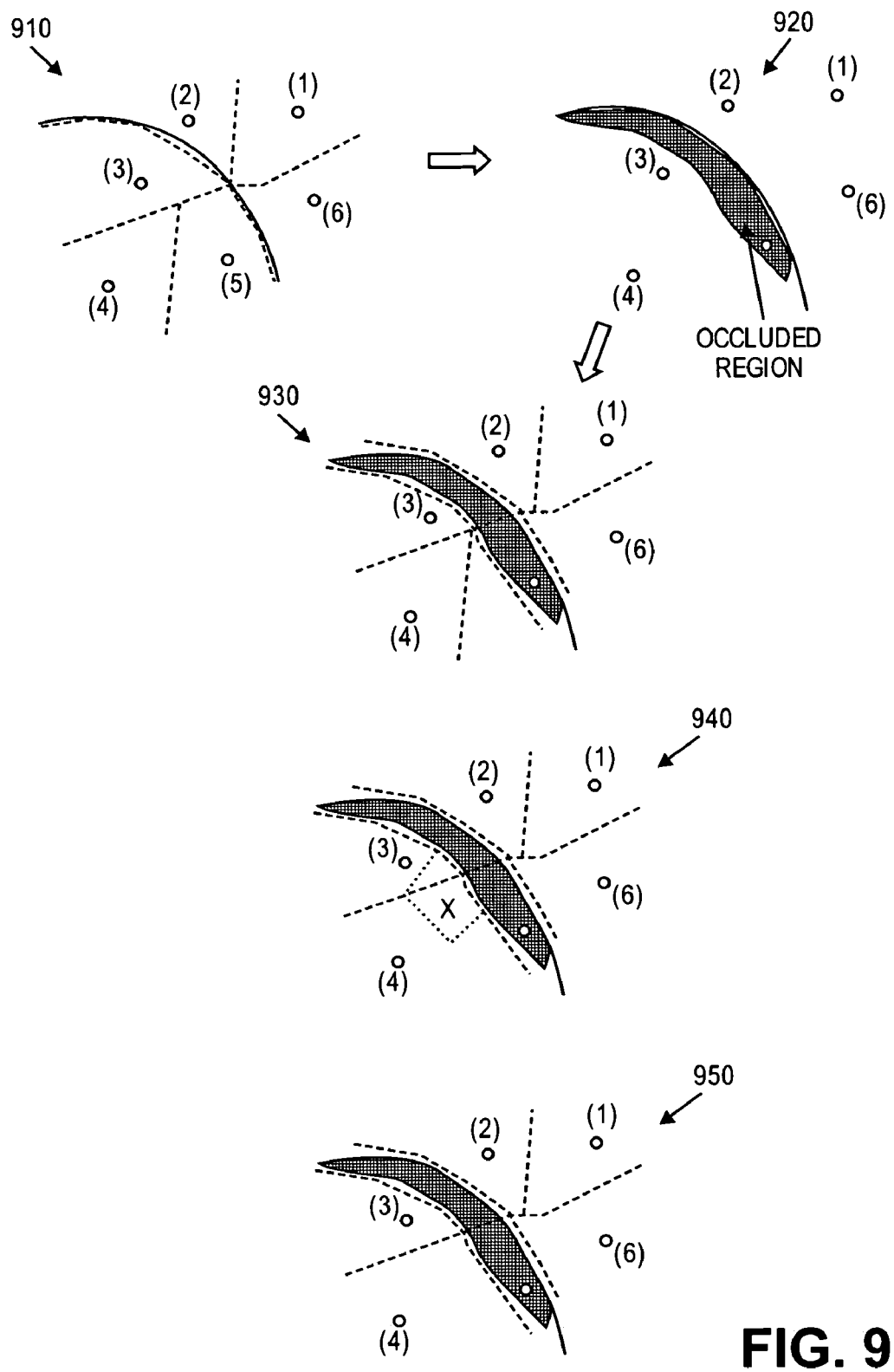
FIG. 9 shows an example of a modification to predict pixels in or near an occluded region using one reference image.

An example of a modification to predict pixels in or near an occluded region using one reference image is shown in FIG. 9. AOI cells have been modified to adapt to the moving object boundary are shown at 910. The occluded region is shown at 920. The second modification to the filter is shown at 930, where the AOI cell for motion vector (3) has been reduced to remove the portion that overlaps with the occluded region. The AOI cell for motion vector (5), which is within the occluded region, has been removed from the filter. The AOI cell for motion vector (4) has been expanded to include portions of the former AOI cell of motion vector (5) which are outside of the occluded region. To predict a pixel near the occluded region, such as pixel x shown at 940, filter weights are determined using eq. (3), as shown at 950. To predict a pixel within the occluded region, such as pixel x shown at 940, the nearest motion vector, with a filter weight of 1, is used to form a one-tap filter. In this case, the nearest motion vector is (5).

Figure 10:
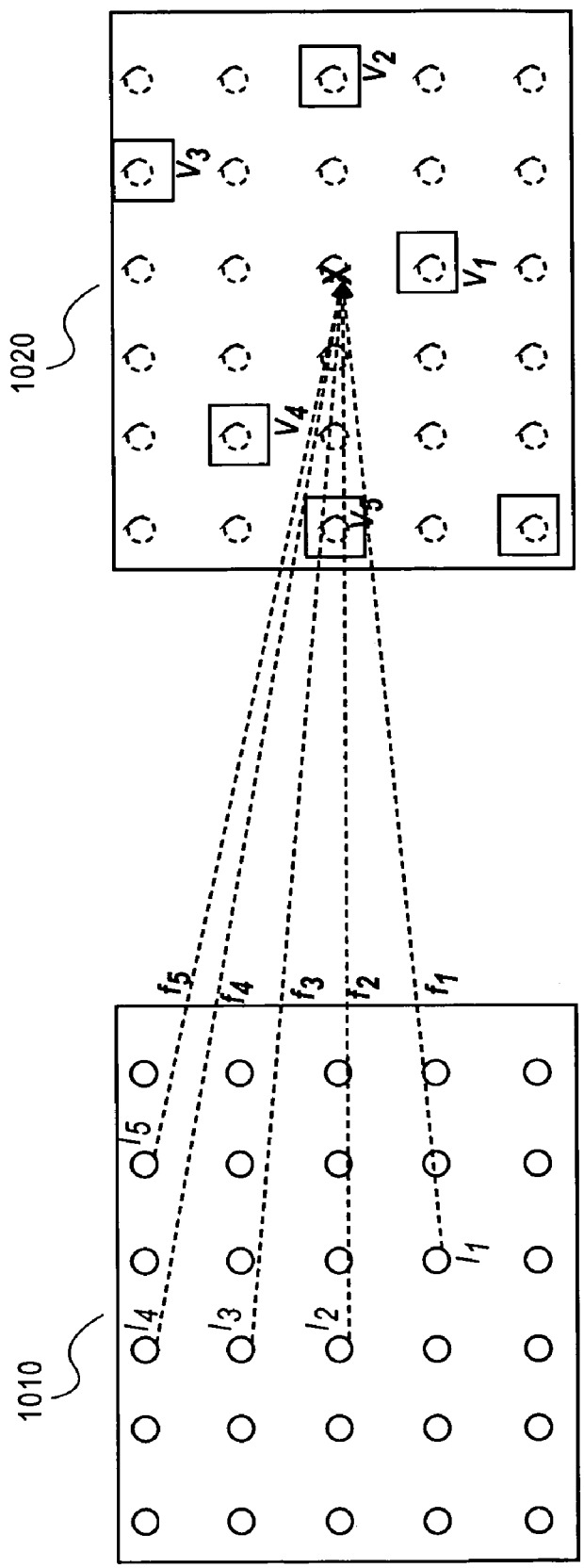
FIG. 10 shows an example of using the filter to predict a pixel in the target image.

The adaptive filtering process generates an area-based filter that is defined in the time domain and that couples neighboring motion vectors during a temporal prediction process. The filter adapts naturally to a non-uniform or irregular sampling pattern of motion vectors in a motion image, to object shapes and boundaries, and to spatial textures. FIG. 10 illustrates more detail of 240 (FIG. 2A), at which the filter is used to predict a pixel x in the target image. Pixels in a reference image 1010 are used to predict pixels in a target image 1020. The reference pixels are represented by solid circles in reference image 1010, and the target pixels to be predicted are represented by dashed circles in target image 1020.

The filter forms a prediction for pixel x in the target image 1020 using a tap structure of local motion vectors $v_1$ through $v_5$. The motion vectors are local to pixel x because each of their respective AOI cells overlap with at least a portion of the AOI cell for pixel x. Each motion vector $\{v_i\}$ in the tap structure maps to image data $\{I_i\}$ in the reference image 1010. The adaptive temporal prediction filter adjusts the reference data $\{I_i\}$ by a filter weight $\{f_i\}$ to predict pixel x. In one embodiment, the prediction filter uses the tap structure and the filter weights to generate a prediction according to the following equation:

$$\text{Prediction} = I_1 * f_1 + I_2 * f_2 + I_3 * f_3 + I_4 * f_4 + I_5 * f_5$$

where the filter tap is defined by the local motion vectors, and the filter coefficients $\{f_i\}$ are determined using eq. (3).

After the initial prediction, the process re-estimates the values of the motion vectors, as shown in block 250 of FIG.

Figure 11:
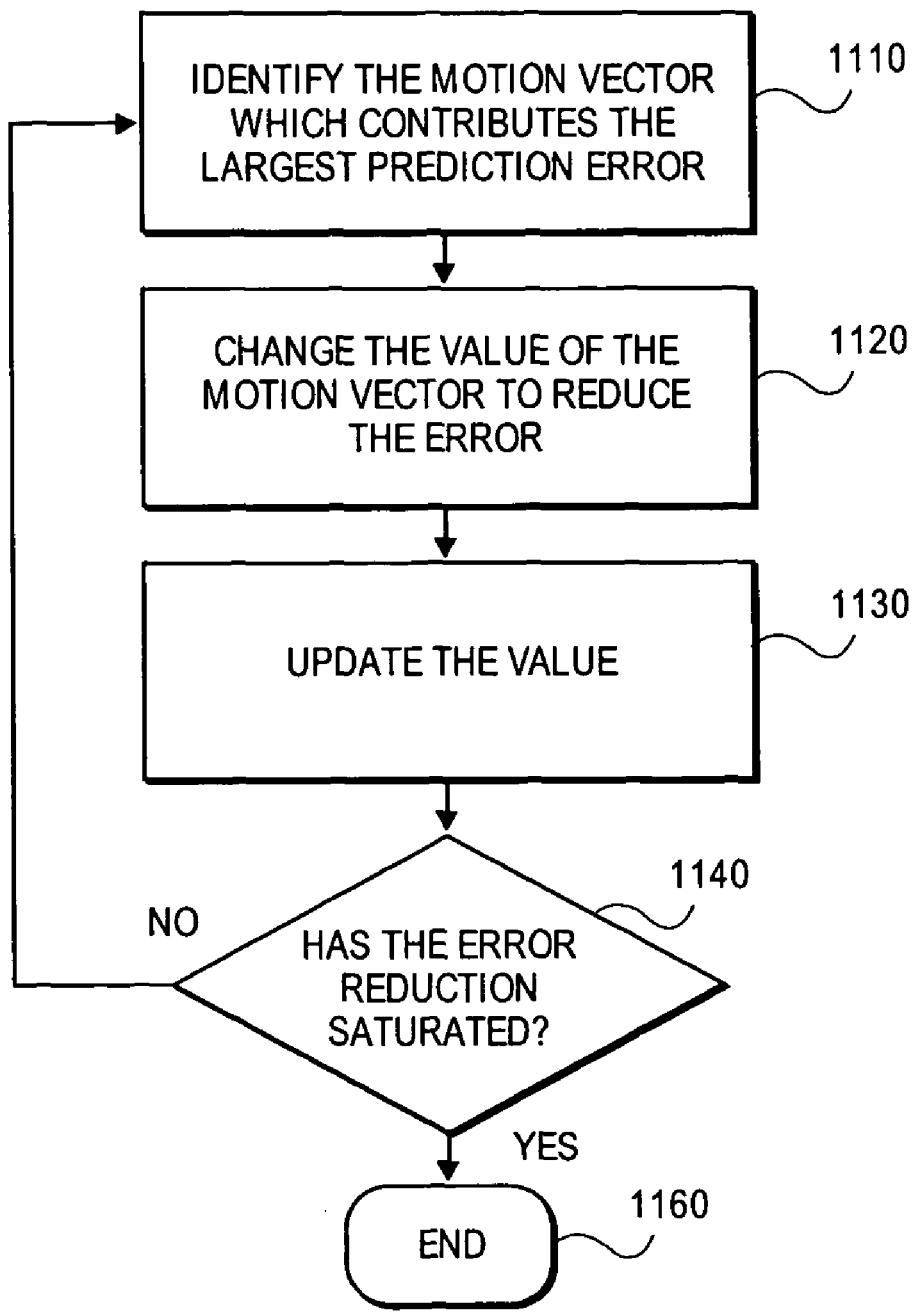
FIG. 11 shows an example of a method that re-estimates the values of the motion vectors to improve the accuracy of the filter.

2A, to improve the accuracy of the filter. In one embodiment, the re-estimation is performed using the method illustrated in FIG. 11. At 1110, the motion vector that contributes the largest prediction error to the AAOI filter is identified. Then, at 1120 the value of the identified motion vector is changed until the AAOI filter's prediction error is reduced or minimized. At 1130, the value of the motion vector is then updated with the changed value. At 1140, if the error reduction has saturated, then the process ends. Otherwise, the process returns to 1110 until the prediction error reduction saturates. Then, in some embodiments, the process of FIG. 2A is repeated for all the motion vectors in the image.

Figure 3B:
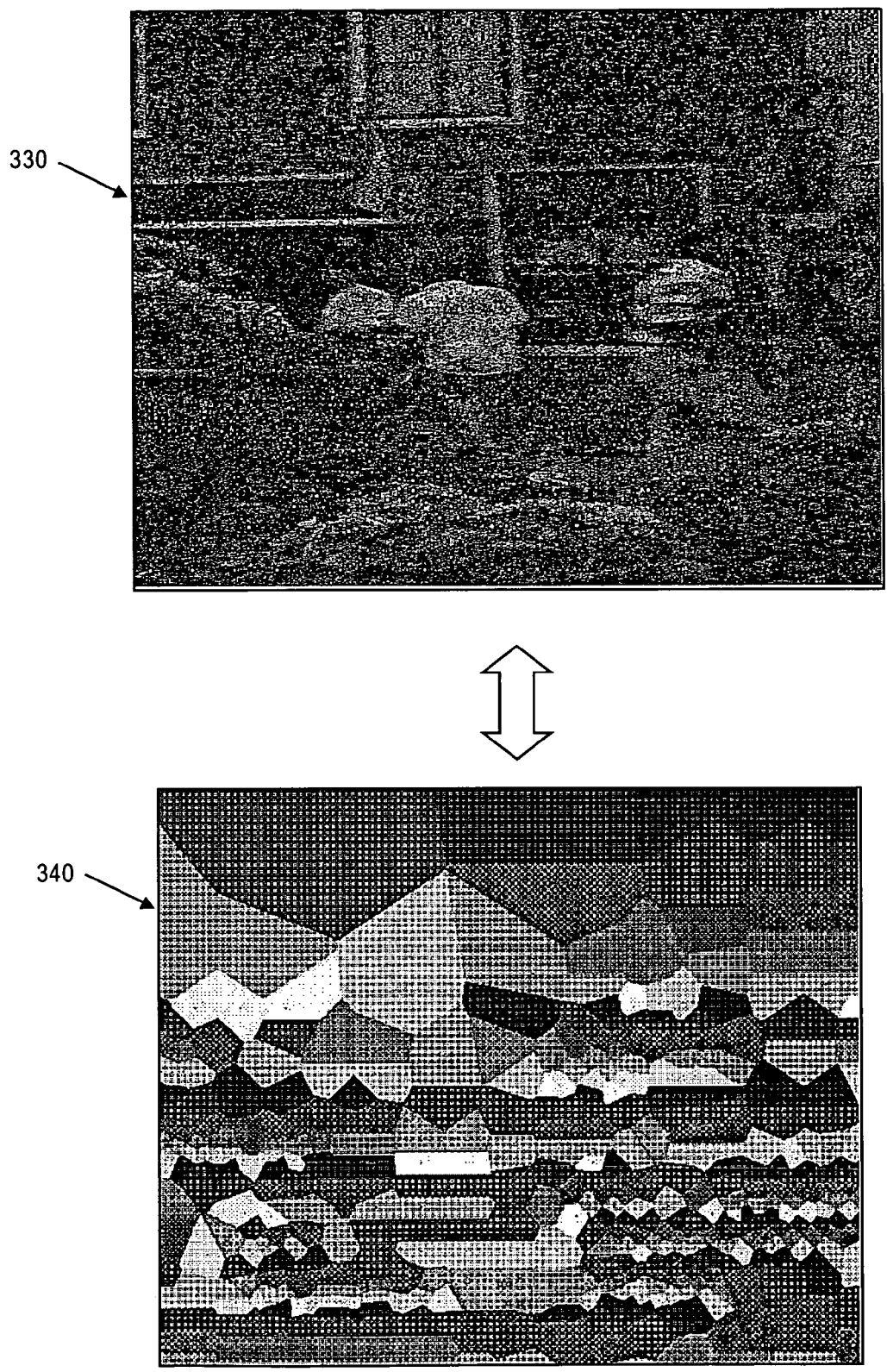
FIG. 3B shows an example of an irregular pattern of motion vectors that is generated using the moving object boundaries.
Figure 12:
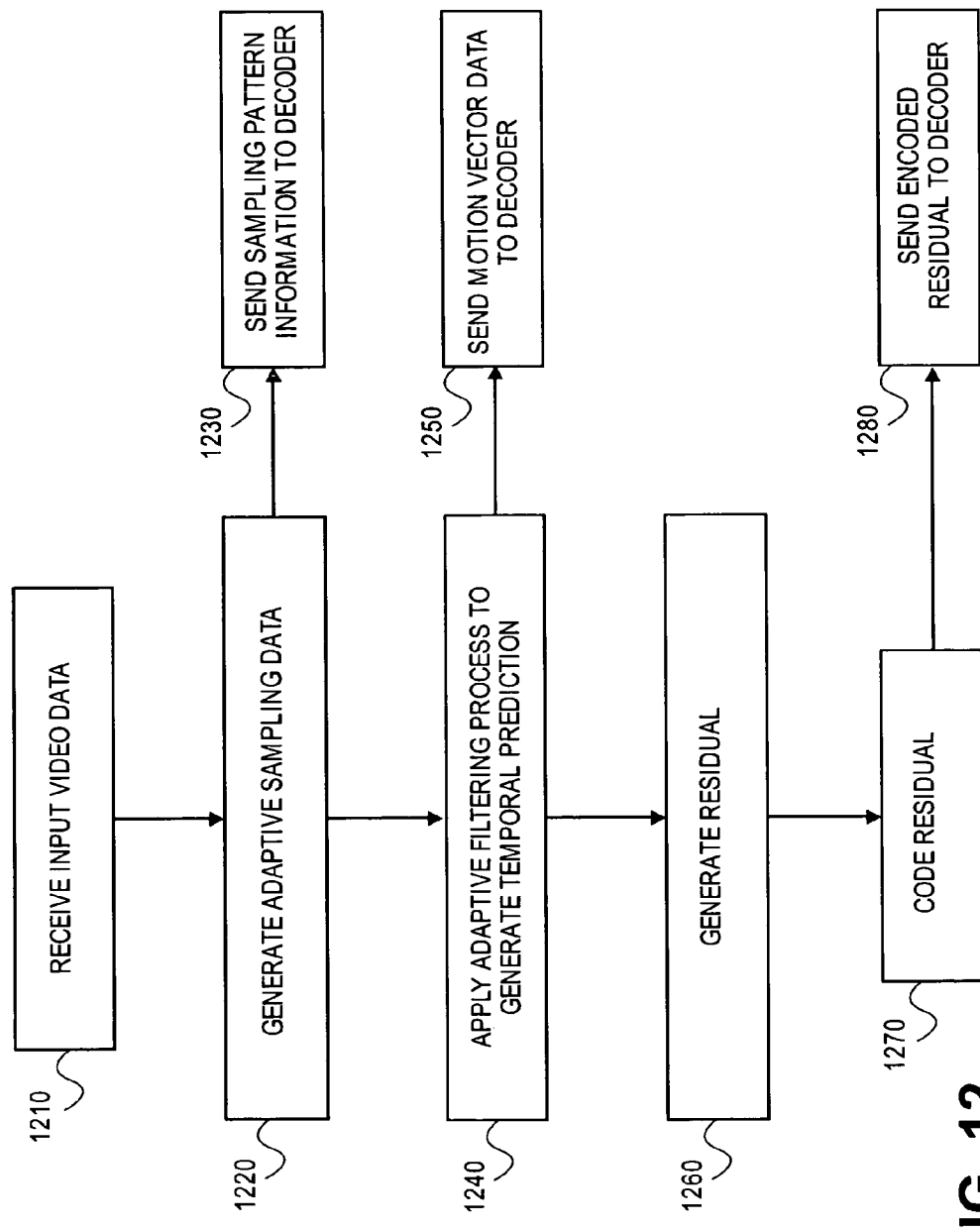
FIG. 12 shows an example of a video coding system for encoding an image (or frame, or field) of video data using the adaptive temporal filter.

In one embodiment, the AAOI filter is used by a video coding system for encoding an image (or frame, or field) of video data, as shown in FIG. 12. At 1210, the encoder receives input video data, such as an input target image and data related to the input target image, such as data for boundaries of moving objects in the target image. A set of reference images, which contain decoded image data related to the target image, is available to the encoder during the encoding process, and also to the decoder during the decoding process. At 1220, the encoder generates a sampling, or distribution, of motion vectors associated with the target image. That is, given a number N of motion vectors, these N motion vectors are placed in the target image. The positions of the motion vectors are generally adapted to areas of motion in the image content, yielding an irregular pattern of motion vectors as shown in FIG. 3B, for example. At 1230, the sampling pattern information (e.g., bits to represent the pattern) is transmitted to a decoder. Many approaches can be used to generate the adaptive sampling pattern.

At 1240, a temporal prediction filtering process is applied to the irregular motion sampling pattern. This adaptive filtering process uses the motion vectors, irregular sampling pattern, and reference images to generate a prediction of the target image. At 1250, the motion vector values are coded and sent to the decoder. At 1260, a residual is generated, which is the actual target data of the target image minus the prediction error from the adaptive filtering process. At 1270, the residual is coded and, at 1280, is sent to the decoder.

Figure 13:
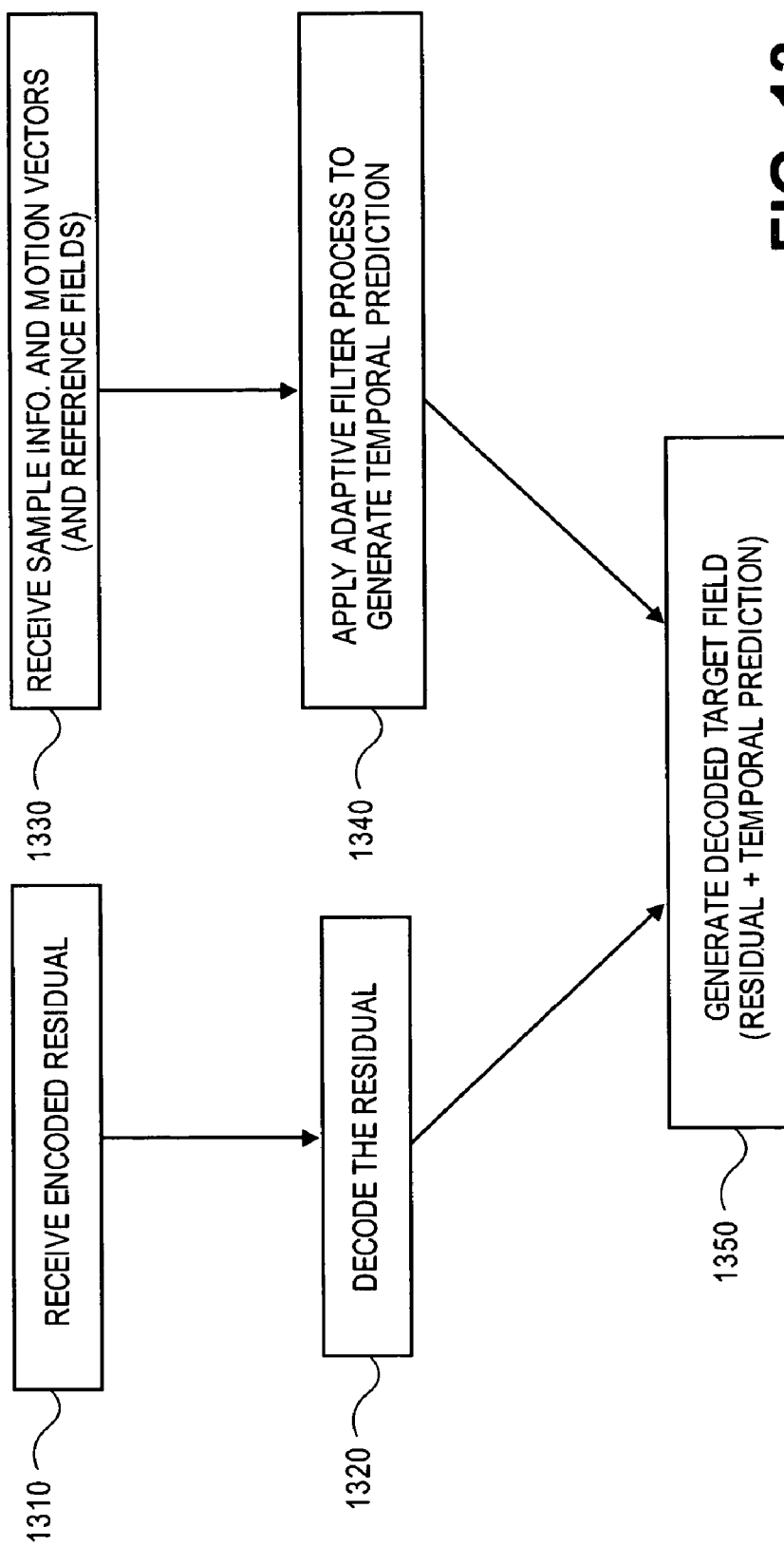
FIG. 13 shows an example of using the filter in decoding an image (or frame, or image) of video data.

In another embodiment, the AAOI filter is used in decoding a image (or frame, or image) of video data, as shown in FIG. 13. At 1310, an encoded residual is received. At 1320, the decoder decodes the received encoded residual. At 1330, the decoder receives the sample pattern information, reference images, and motion vector values. Then, at 1340 the decoder applies the adaptive temporal filter procedure to generate the temporal prediction. At 1350, the decoded target image is generated by adding the decoded residual to the temporal prediction.

Figure 14:
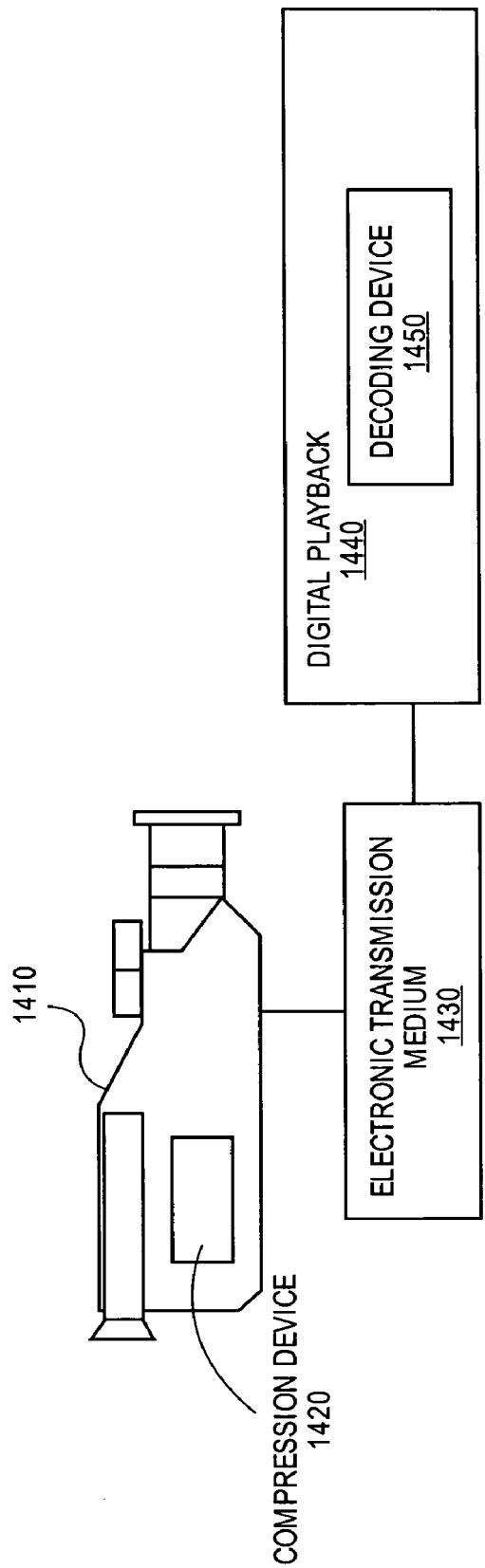
FIG. 14 shows an example of a video system that uses the adaptive area of influence filter.

FIG. 14 shows an example of a system that uses the adaptive area of influence filter. A digital video camera 1410 captures images in an electronic form, and processes the images using compression device 1420, which uses the adaptive area of influence filter during the compression and encoding process. The encoded images are sent over an electronic transmission medium 1430 to digital playback device 1440. The images are decoded by decoding device 1450, which uses the filter during the decoding process. Camera 1410 is illustrative of various image processing apparatuses (e.g., other image capture devices, image editors, image processors, personal and commercial computing platforms, etc.) that include embodiments of the invention. Likewise, decoding device 1450 is illustrative of various devices that decode image data.

While the invention is described in terms of embodiments in a specific system environment, those of ordinary skill in the art will recognize that the invention can be practiced, with modification, in other and different hardware and software environments within the spirit and scope of the appended claims.

The invention claimed is:

1. A method comprising:
   receiving a target image, wherein a position of an object in the target image is different from a position of the object in a reference image;
   using a boundary of the object to generate an irregular pattern of target image motion vectors;
   using the target image motion vectors to partition the target image into area of influence cells, wherein each area of influence cell contains a unique one of the target image motion vectors;
   modifying an adaptive area of influence filter for area of influence cells near the boundary, wherein each area of influence cell includes pixels that belong to a same motion layer as a motion vector for each area of influence cell and pixels are assigned to an area of influence cell with a smallest distance between a location of a pixel to be assigned and a location of the motion vector corresponding to the area of influence cell;
   using the modified filter to estimate an occluded region; and
   using a reference image that does not have the occluded region to predict the target image.

2. The method of claim 1, wherein using a boundary of the object to generate an irregular pattern of target image motion vectors comprises:
   positioning a motion vector inside the object; and
   using at least one parameter associated with the boundary to distribute motion vectors in relation to the boundary.

3. The method of claim 1, further comprising:
   determining that a reference image that does not have the occluded region is unavailable;
   re-estimating the occluded region;
   modifying the filter around the occluded region; and
   using a reference image that includes the occluded region to predict the target image.

4. The method of claim 3, wherein modifying the filter around the occluded region comprises:
   for each motion vector outside the occluded region, modifying the area of influence cell for the motion vector to include pixels that belong to same motion layer as motion vector and are outside the occluded region, such that:

$T_i = \{x | x.\text{epsilon}.O_i, \text{dist}(x, x_i) < \text{dist}(x, x_j).\text{epsilon}.N, j.\text{noteq}.i), x C\}$ where x is a pixel to be predicted, $x_i$ is a pixel position of a particular motion vector i in a set of N motion vectors, $O_i$ is a motion layer assignment of an object for motion vector i, $T_i$ is an area of influence cell for the particular motion vector i, a set $j.\text{epsilon}.N, j.\text{noteq}.i$ represents all other motion vectors, and C represents the occluded region.

5. The method of claim 3, wherein modifying the filter around the occluded region comprises:
   for each motion vector outside the occluded region, modifying the area of influence cell for the motion vector to include pixels that belong to same motion layer as motion vector and are outside the occluded region;
   for each pixel within the occluded region, using a nearest motion vector with a filter weight of one to predict the pixel; and
   for each pixel outside of the occluded region, using the modified area of influence cells to determine filter weights to predict the pixel.

6. An apparatus comprising:
- a receiver that receives a target image, wherein a position of an object in the target image is different from a position of the object in a reference image;
- a generator that uses a boundary of the object to generate an irregular pattern of target image motion vectors;
- a partitioner that uses the target image motion vectors to partition the target image into area of influence cells, wherein each area of influence cell contains a unique one of the target image motion vectors; and
- a filter modifier that modifies an adaptive area of influence filter for area of influence cells near the boundary, wherein each area of influence cell includes pixels that belong to a same motion layer as a motion vector for each area of influence cell and pixels are assigned to an area of influence cell with a smallest distance between a location of a pixel to be assigned and a location of the motion vector corresponding to the area of influence cell;
- an estimator that uses the modified filter to estimate an occluded region; and
- a predictor that uses a reference image that does not have the occluded region to predict the target image.

7. The apparatus of claim 6, wherein the generator uses the boundary of the object to generate an irregular pattern of target image motion vectors by positioning a motion vector inside the object, and using at least one parameter associated with the boundary to distribute motion vectors in relation to the boundary.

8. A non-transitory computer readable medium storing a computer program of instructions which, when executed by an electronic data processing system, causes the system to perform a method comprising:
- receiving a target image, wherein a position of an object in the target image is different from a position of the object in a reference image;
- using a boundary of the object to generate an irregular pattern of target image motion vectors;
- using the target image motion vectors to partition the target image into area of influence cells, wherein each area of influence cell contains a unique one of the target image motion vectors;
- modifying an adaptive area of influence filter for area of influence cells near the boundary, wherein each area of influence cell includes pixels that belong to a same motion layer as a motion vector for each area of influence cell and pixels are assigned to an area of influence cell with a smallest distance between a location of a pixel to be assigned and a location of the motion vector corresponding to the area of influence cell;
- using the modified filter to estimate an occluded region; and
- using a reference image that does not have the occluded region to predict the target image.

9. The non-transitory computer readable medium of claim 8, wherein using a boundary of the object to generate an irregular pattern of target image motion vectors comprises:
- positioning a motion vector inside the object; and
- using at least one parameter associated with the boundary to distribute motion vectors in relation to the boundary.

* * * * *